United States Patent [19]

Gold

[11] 3,965,175

[45] June 22, 1976

[54] POULTRY COCCIDIOSIS TREATING COMPOSITIONS AND METHOD OF USING THE SAME

[75] Inventor: Elijah H. Gold, West Orange, N.J.

[73] Assignee: Schering Corporation, Kenilworth, N.J.

[22] Filed: Feb. 12, 1975

[21] Appl. No.: 549,263

[52] U.S. Cl. .................... 260/562 R; 260/562 K; 424/324; 426/532
[51] Int. Cl.² ............... C07C 103/14; C07C 103/34
[58] Field of Search ..................... 260/562 R, 562 K

[56] References Cited
UNITED STATES PATENTS

| 2,776,241 | 1/1957 | Priewe et al. ................ 260/562 K |
| 2,995,605 | 8/1961 | Siegrist et al. ............... 260/562 K |

*Primary Examiner*—C. Davis
*Attorney, Agent, or Firm*—Stephen B. Coan; Bruce M. Eisen

[57] ABSTRACT

Poultry coccidiosis is treated with certain malonanilides.

16 Claims, No Drawings

POULTRY COCCIDIOSIS TREATING COMPOSITIONS AND METHOD OF USING THE SAME

The present invention relates to new malonanilides and new methods for the prevention and control of poultry coccidiosis.

Coccidiosis is a widespread poultry disease, particularly of chickens, which is produced by infections of protozoa of the genus Eimeria causing severe pathology in the intestines and ceca of poultry. Geese, ducks, turkeys, guinea fowl and pheasants also suffer from coccidiosis infection although less severely than chickens. Some of the most significant of the Eimeria species are *E. tenella, E. acervulina, E. necatrix, E. brunetti, E. maxima, E. adenoeides, E. maleagrimitis E. battakli,* and *E. truncata.* This disease is generally spread by the birds picking up the infectious organism in droppings on contaminated litter or ground, or by way of food or drinking water. The disease is manifested by hemorrhage, accumulation of blood in the ceca, passage of blood in the droppings, weakness and digestive disturbances. The disease often terminates in the death of the animal, but the fowl which survive severe infections have had their market value substantially reduced as a result of infection induced poor weight gain and reduced feed efficiency. Accordingly, the successful control of coccidiosis is highly important to the poultry industry.

Many coccidiostats have been used to prevent economic loss caused by coccidiosis. Unfortunately, the protozoan parasites develop a tolerance toward particular coccidiostats. Thus, it is a continuous search for new coccidiostats.

Applicant has found that the new malonanilides of the present invention prevent, inhibit or control the disease and the economic losses concomitant therewith.

In its compound aspect, the present invention relates to compounds of the formula:

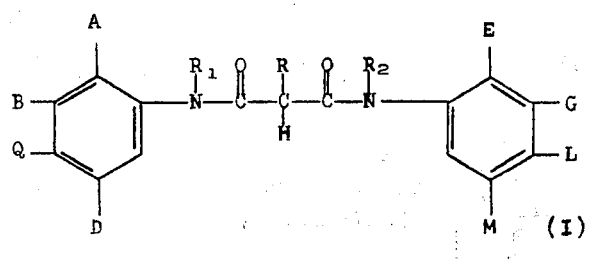

(I)

wherein A, B, Q, D, E, G, L and M are each selected from the group consisting of hydrogen, $NO_2$, $CF_3$, Cl and Br with the proviso that 3 to 5 of these are hydrogen and that A and E cannot be $NO_2$;

$R_1$ and $R_2$ are each selected from the group consisting of H and $C_1-C_4$ alkyl; and R is selected from the group consisting of $C_1-C_6$ alkyl and cyclopentenyl.

As used herein, the term "alkyl" includes straight or branched chained radicals having the specified number of carbon atoms as illustrated by methyl, ethyl isopropyl, butyl, isobutyl and tert. butyl and the like. Preferably $R_1$ and $R_2$ are hydrogen. R is preferably methyl.

A preferred class of compounds are those of the formula:

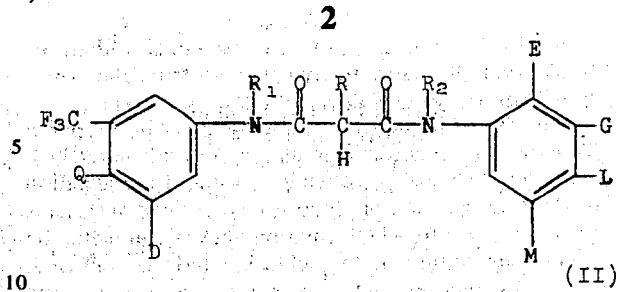

(II)

wherein Q, D, E, G, L, M, R, $R_1$ and $R_2$ are as above defined with the proviso that 2 to 4 of these are hydrogen and at least one of Q, G and L is $CF_3$.

In its composition aspect, the present invention relates to a poultry feed composition adapted to inhibit poultry coccidiosis which comprises a poultry feed having admixed therewith a malonanilide of formulae I or II in an amount sufficient to inhibit coccidiosis in poultry.

In its process of using aspect, the present invention relates to a process of controlling coccidiosis in poultry, particularly chickens, which comprises administering orally to said poultry an amount sufficient to control coccidiosis in poultry of a malonanilide of formulae I or II.

The present invention is based upon the discovery that the malonanilides of formula (I) and particularly of formula (II) when administered with normal poultry nutrients or water are effective in the control of coccidiosis.

Particularly preferred compounds are:
N,N'-bis(4'-nitro-3'-trifluoromethyl)-methylmalonanilide, N,N'-bis[3',4'-bis(trifluoromethyl)]methylmalonanilide, and N-[3',4'-bis(trifluoromethyl)]-N'-(4'-nitro-3'-trifluoromethyl)-methylmalonanilide.

Those compounds of formula I which are symmetrical may be conveniently prepared in suitable solvents, at ambient temperatures, according to reaction scheme A:

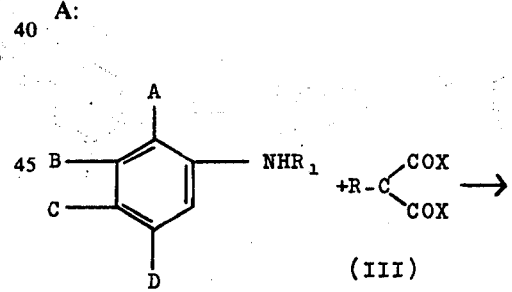

(III)

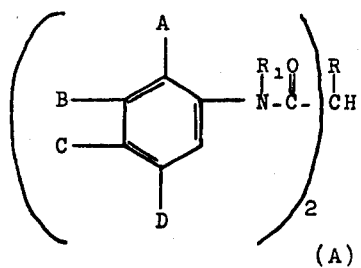

(A)

wherein R, $R_1$, A, B, C and D each have the above meaning and X represents halogen (preferably chlorine or bromine). X, of course, may represent an alkoxy radical (i.e. reagent III is a substituted malonic ester) but this condensation is preferably carried out at elevated temperatures, up to the boiling point of the solvent utilized. Of course, those compounds wherein $R_1$ is alkyl can be alternatively prepared from the corresponding non N alkylated malonanilide.

The unsymmetrical malonanilides may be prepared from a first aniline through an acyl intermediate (IV), according to reaction scheme B, without the isolation of IV. A convenient procedure is wherein Z represents chlorine, and, after the formation of IV is complete, the excess substituted malonylchloride (III) is removed, e.g. by distillation, and a second aniline is added and condensed with IV:

(preferably chlorine or bromine) or $-OR_4$. $R_4$ is preferably an organic radical, conveniently, but not necessarily the same as $R_3$.

The exact nature of the organic radicals $R_{3(4)}$ is not critical, but is most conveniently methyl or ethyl. Intermediate VI, may be readily purified, and, when $R_{3(4)}$ is an organic radical, may be condensed directly with the second aniline, preferably at elevated temperatures. Alternatively, intermediate VI may be converted to the corresponding acid halide (prior hydrolysis preferred when $R_{3(4)} \neq H$) by such convenient reagents as $SOCl_2$, $PCl_3$, $PBr_3$, oxalyl chloride, etc., and then condensed with the second aniline as depicted in reaction scheme (D) below.

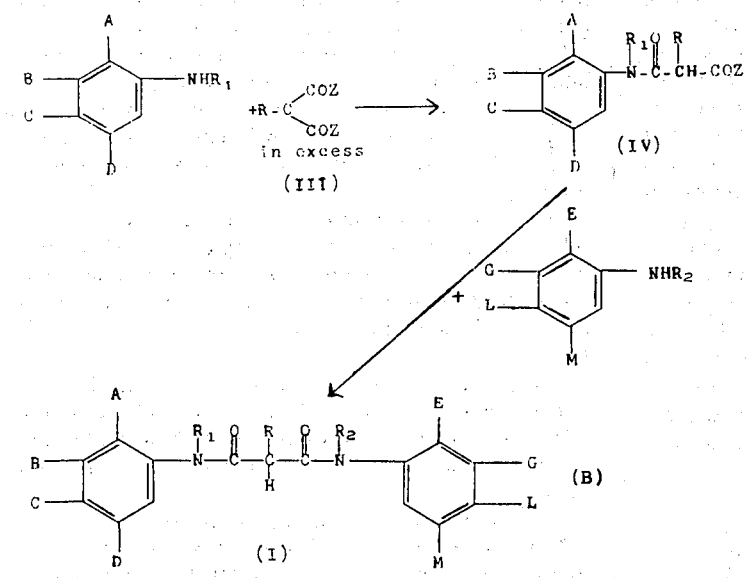

An alternative to scheme B is scheme C below, which utilizes an acid or ester intermediate (V), wherein $R_3$ is hydrogen or an organic radical and Y is a halogen

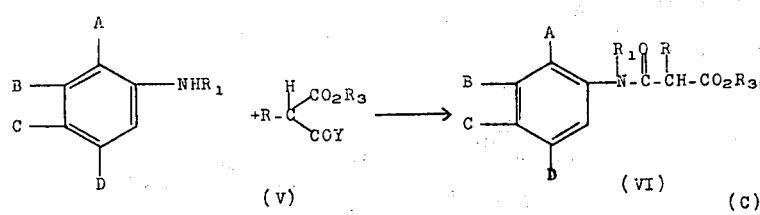

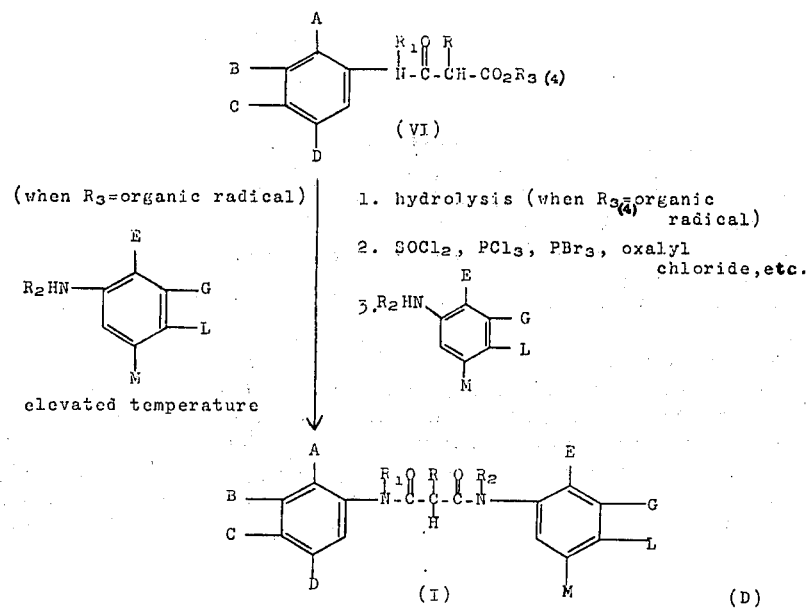

The various starting materials used herein are commercially available.

The malonanilides of the present invention are administered orally to poultry by being admixed as an element of the poultry feed or suspended in the drinking water. When the infection is particularly severe, the malonanilide is preferably added to the drinking water since the birds will continue to drink even after they have stopped eating solid food.

In those cases wherein poultry feed is employed as the vehicle for the malonanilides, it is desirable that the drug be mixed uniformly throughout the feed. This is accomplished by preparing a premix or feed supplement wherein the thiophene is present in concentrations of from about 3% to about 25% by weight, preferably about 5–20% by weight, and where the carrier or diluent is preferably an ingredient of the feed, e.g. corn or cornmeal. Any non-toxic orally ingestible carrier may, of course, be used. Such carriers are, for example, distillers dried grains, corn starch, potato starch, fermentation residues, ground oysters shells, attapulgus clay, rice bran, wheat bran, wheat middling, molasses solubles, corn meal, edible vegetable substances, soybean cake, soybean meal, antibiotic mycelia, crushed lime stone and the like. These feed supplements are then uniformly mixed throughout the poultry ration by conventional techniques such as milling. It is preferred to use, in the industry, to use one pound of such supplement for one ton of feed.

When it is desired to administer the compounds of the invention in the water ration, the malonanilides may be suspended by non-toxic surfactants to produce an adequate dosage of active.

An effective dosage will vary for the individual compounds within the invention and for the age and weight and particular species of birds. A dosage range of from 25 to 250 ppm may be advantageously utilized. A dosage range of 0.0025% to 0.005% (25 to 50 ppm) of N,N'-bis[3',4'-bis(trifluoromethyl)]-methylmalonanilide or N[3',4'-bis(trifluoromethyl)]-N'-(4'-nitro-3'-trifluoromethyl)-methylmalonanilide in feed fed ad lib generally provides excellent prophylaxis against coccidiosis.) Although additional active may be added to the feed, it generally provides no additional prophylactic benefits although resulting in additional cost.

The invention will be further described in greater detail hereinbelow with respect to the following illustrative, non-limiting examples:

Example 1

N,N'-Bis(4'-nitro-3'-trifluoromethyl)-methylmalonanilide

To 15.0 g (0.095 mole) of methylmalonyl chloride in 400 ml. of benzene, add 39.1 g (0.19 moles) of 4-nitro-3-trifluoromethyl aniline and reflux for two hours. Filter off the product of this example which melts, after recrystallization from benzene-methanol, at 225–226.5°C.

Example 2

N,N'-Bis[3',4'-bis(trifluoromethyl)]-methylmalonanilide

To 6.5 g (0.055 moles) of methylmalonic acid in 150 ml. of ether with stirring, slowly add 22.9 g (0.11 moles) of phosphorous pentachloride, and stir for 16 hours. Add 25.2 g (0.11 moles) of 3,4-bis(trifluoromethyl)aniline and stir the mixture for four hours. Pour onto 400 ml. of ice water, neutralize the ether layer with saturated aqueous sodium bicarbonate, dry over magnesium sulfate, filter, reduce the ether volume to about one third, cool, and filter to obtain the product of this example, which crystallizes out. Recrystallize from acetonitrile; m.p. 252°–253°C.

Example 3

N,N'-Dimethyl-N,N'-bis[3',4'-bis(trifluoromethyl)-]methylmalonanilide

Method A. Carry the reaction out as in Example 2, except add 26.5 g (0.11 moles) of N-methyl-3,4-bis(trifluoromethyl) aniline to the reaction mixture. After drying the ether solution, remove the ether and triturate the crude product with isopropyl ether, and obtain the product of this example; m.p. 124°–125.5°C.

Method B. To a stirred solution, under nitrogen, of -bis[2.5 g (0.0046 moles) of N,N'-bis]3',4'-bis(trifluoromethyl)]methylmalonanilide in 30 ml. of dry dimethylformamide, add 0.55 g (0.013 moles) of sodium hydride (55% dispersion in mineral oil) and stir for 16 hours. Add 5.6 g (0.040 moles) of methyl iodide, heat on a steam bath for 30 minutes, cool, carefully pour into 100 ml. ice cold water, and extract three times with 100 ml. portions of ether. Wash the combined ether extract with 100 ml. of 5% aqueous sodium thiosulfate, followed by two washings with 100 ml. portions of water. Dry over magnesium sulfate, filter, remove the ether and obtain the product of this example upon trituration with isopropyl ether.

Example 4

N,N'-Bis[3',5'-bis(trifluoromethyl)]-ethylmalonanilide

To 1.45 g (0.011 mole) of ethylmalonic acid in 50 ml. of ether, with stirring, slowly add 4.6 g (0.022 moles) of phosphorous pentachloride and stir for 16 hours. Add 5.0 g (0.022 moles) of 3,4-bis(trifluoromethyl)aniline and stir for 18 hours and then remove any solid by filtration. Remove the ether and triturate with hexane to obtain the product of this example. Recrystallize from chloroform; m.p. 232°–233°C.

Example 5

N,N'-Bis(3',4'-dichloro)-methylmalonanilide

To 7.5 g (0.048 moles) of methylmalonyl chloride in 100 ml. of ether, with stirring, add 15.55 g (0.096 moles) of 3,4-dichloroaniline and stir for 48 hours. Pour onto 125 ml. of ice water, wash once with 100 ml. of 5% hydrochloric acid, followed by 100 ml. of water, followed by neutralization with saturated aqueous sodium bicarbonate. Dry over magnesium sulfate, filter, remove the ether and recrystallize from benzene to obtain the pure product of this example; m.p. 235°–236°C.

Example 6

N,N'-Bis(3',4'-dibromo)-methylmalonanilide

Carry out the reaction as in Example 5, except use, 24.09 g (0.096 moles) of 3,4-dibromoaniline, and obtain the product of this example.

Example 7

N-[3',4'-bis(trifluoromethyl)]-N'-(3',5'-dichloro)-methylmalonanilide

To 75.0 g (0.48 moles) of methylmalonyl chloride in 1 liter of ether, with stirring, add 7.77 g (0.048 moles) of 3,5-dichloroaniline, and stir for 24 hours. Remove the ether and excess methylmalonyl chloride under high vacuum, add 100 ml. of ether to the residue, followed by 11.0 g (0.048 moles) of 3,4-bis(trifluoromethyl)aniline with stirring. Stir for 24 hours, pour onto 100 ml. of ice water, wash once with 5% hydrochloric acid, followed by 100 ml. of water, followed by neutralization with saturated aqueous sodium bicarbonate. Dry over magnesium sulfate, filter, remove the ether and recrystallize from acetonitrile to obtain the pure product of this example; m.p. 219.5°–221°C.

Example 8

Ethyl 3',4'-bis(trifluoromethyl)-methylmalonanilate

Method A. Reflux 25.2 g (0.11 moles) of 3,4-bis(trifluoromethylaniline) in 250 g (14 moles) of diethyl methylmalonate for 24 hours. Remove the excess diethyl methylmalonate by distillation and crystallize the product of this example from hexane; m.p. 91°–94°C.
Method B. To a stirred solution of 16.5 g (0.10 mole) of ethyl methylmalonyl chloride in 150 ml. of ether, add 22.9 g of 3,4-bis(trifluoromethyl)aniline, and stir for 16 hours. Pour onto 100 ml. of water, neutralize with saturated aqueous sodium bicarbonate, followed by 100 ml. of water. Dry over magnesium sulfate, filter, remove the ether and obtain the pure product of this example after crystallization from hexane.

Example 9

3',4'-Bis(trifluoromethyl)-methylmalonanilic acid
Method A. To a solution of 35.5 g (0.10 moles) of ethyl 3',4'-bis(trifluoromethyl)-methylmalonanilate (from Example 8) in 100 ml. of ethanol, add 5.61 g (0.10 moles) of potassium hydroxide, and stir, with cooling, maintaining the temperature of the solution at 25°C. After 6 hours, add 8.4 ml. of concentrated hydrochloric acid, remove the solvent, triturate well with water and recrystallize the product of this example from chloroform; m.p. 133°–134°C. Method B. To 29.5 g (0.25 moles) of methylmalonic acid in 175 ml. of ether, with stirring, slowly add 104.1 g (0.50 moles) of phosphorous pentachloride, and stir for 16 hours. To this solution, with stirring, slowly add a solution of 5.7 g (0.025 moles) of 3,4-bis(trifluoromethyl)aniline in 70 ml. of ether and stir for 16 hours. Remove the ether, and carefully add the resulting oil to ice cold water, and stir until hydrolysis is complete. Extract several times with ether, remove the ether, and triturate the crude residue thoroughly with water to remove any methylmalonic acid. Triturate the residue with hexane and recrystallize the product of this example as in "Method A" above.

Example 10

3',4'-bis(trifluoromethyl)-methylmalonaniloyl chloride

To 17.0 g (0.05 moles) of 3',4'-bis(trifluoromethyl-methylmalonanilic acid, from Example 9, in 150 ml. of ether at 0°C, add 15.0 g (0.12 moles) oxalyl chloride followed by two drops of dimethylformamide, and stir at 0°C for 2 hours. Remove the ether and excess oxalkyl chloride in vacuo at 40°C, and triturate the product of this example with 100 ml. of benzene.

EXAMPLE 11

N-[3',4'-bis(trifluoromethyl)]-N'-(4'-nitro-3'-trifluoromethyl)-methylmalonanilide To the acid chloride, obtained in Example 10, dissolved in 200 ml. of ether, add 11.0 g (0.05 moles) of 4-nitro-3-trifluoromethyl aniline, dissolved in 100 ml. of dry dimethylformamide, and reflux for 20 hours. Cool, pour onto ice water and extract well with ether. Wash the combined ether extracts successively with water, 5% aqueous potassium carbonate and saturated sodium chloride solutions. Dry over magnesium sulfate, filter, remove the solvent and obtain the crude product of this example. Crystallize from acetonitrile; m.p. 230.5-231°C.

Example 12

N-[3',4'-bis(trifluoromethyl)]-N'-(4'-nitro-2'-trifluoromethyl)-methylmalonanilide In a manner identical to Example 11, except using 11.0 g (0.05 moles) of 4-nitro-2-trifluoromethylaniline, obtain the product of this example; m.p. 146°–147°C.

Example 13

N-[3',4'-bis(trifluoromethyl)]-N'-(4'-nitro)-methylmalonanilide

In a manner identical to Example 11, except using 6.9 g (0.05 moles) of 4-nitroaniline, obtain the product of this example; m.p. 217°–219°C.

Example 14

N-[3',4'-bis(trifluoromethyl)]-N'-(3',4',5'-trichloro)-methylmalonanilide

In a manner identical to Example 11, except using 9.8 g (0.05 moles) of 3,4,5-trichloroaniline, obtain the product of this example; m.p. 247°–248.5°C.

Similarly, by following the teachings of the above examples, one may prepare other representative compounds of this invention such as:
N,N'-bis(4'-chloro-3'-nitro)-methylmalonanilide
N,N'-bis(3',4'-dichloro)-methylmalonanilide
N,N'-bis-(4-nitro)-methylmalonanilide
N,N'-bis(4'-nitro-2'-trifluoromethyl)-methylmalonanilide
N,N'-bis-(4'-nitro-3'-trifluoromethyl)-methylmalonanilide
N,N'-bis(4'-nitro-3'-trifluoromethyl)-(2-cyclo-penten-1-yl)-malonanilide
N,N'-bis[3',5'-bis(trifluoromethyl)]-methylmalonanilide
N,N'-bis[3',4'-bis(trifluoromethyl)]-(2-cyclopenten-2-yl)-malonanilide
N,N'-bis[3',5'-bis(trifluoromethyl)]-(2-cyclopenten-1-yl)-malonanilide
N,N'-bis[3',4'-bis(trifluoromethyl)]-ethylmalonanilide
N,N'-bis[2',4'-bis(trifluoromethyl)]-ethylmalonanilide
N,N'-bis[3',4'-bis(trifluoromethyl)]-isopropylmalon-anilide N,N'-bis[3',5'-bis(trifluoromethyl)]-isopropylmalon-anilide N-[3',4'-bis(trifluoromethyl)]-N'-[3',5'-bis(trifluoromethyl)]-methylmalonanilide N,N'-bis[3',4'-bis(trifluoromethyl)]-n-butyl-malonanilide N-methyl-N,N'-bis[3',4'-bis(trifluoromethyl)]methyl-malonanilide N-[2',4'-bis(trifluoromethyl)]-N'-[3',5'-bis(trifluoromethyl)]-methylmalonanilide N-[3',4'-bis(trifluoromethyl)]-N'-(4'-chloro-3'-nitro)methylmalonanilide N-[3',4'-bis(trifluoromethyl)]-N'-(3',4'-dichloro)-methylmalonanilide N-[3',4'-bis(trifluoromethyl)]-N'-(3',5'-dibromo)-methylmalonanilide N-[3',4'-bis(trifluoromethyl)]-N'-(4'-chloro-3'-trifluoromethyl)-methylmalonanilide N-[3',4'-bis(trifluoromethyl)]-N'-(4'-bromo-2'-trifluoromethyl)-methylmalonanilide N-(4'-nitro-3'-trifluoromethyl)-N'-(3',4',5'-trichloro)-methylmalonanilide N-(4'-nitro-3'-trifluoromethyl)-N'-(4'-chloro-3'-trifluoromethyl)-methylmalonanilide N-(4'-nitro-3'-trifluoromethyl)-N'-(3',5'-dichloro)-methylmalonanilide The compounds may be fed to poultry by admixing a premix containing at least one of the compounds with a standard poultry feed according to the illustrative but non-limiting examples.

Example A 25 ppm of N,N'-bis(3',4'-ditrifluoromethyl)-methyl-malonanilide as 1 lb. of a 5% cornmeal premix was admixed with a ton of non-toxic standard turkey starter mash such as:

Turkey Starter Mash

| Ingredient | % | lbs/2000 lb. mix |
|---|---|---|
| Corn | 43.75 | 875 |
| Soybean meal | 35.75 | 715 |
| Alfalfa meal | 3.75 | 75 |
| Fish meal | 5.00 | 100 |
| Meat and Bone — ground | 5.00 | 100 |
| Corn distiller dry solubles | 2.25 | 45 |
| Cottonseed oil | 2.00 | 40 |
| Limestone | 0.25 | 5 |
| Defluorinated phosphate | 1.25 | 25 |
| Salt | 0.50 | 10 |
| Trace Minerals (premix formulation*) | 0.10 | 2 |
| Vitamin mix (WHIT-VIM No. 5**) | 0.40 | 8 |
| | 100.00 | 2000 |

*Trace Minerals premix formulation: Manganese, 6.00%; Zinc, 2.00%; Iron, 2.00%; Copper, 0.20%; Iodine, 0.12%; Cobalt, 0.02%; Calcium, 26.28% – 31.28%.

**WHIT-VIM No. 5 is a commercially available vitamin premix containing per lb. of premix: Vitamin A, 1,200,000 USP units; Vitamin D₃, 400,000 IC units; Vitamin E, 1,000 I units; Vitamin B₁₂ activity, 2.4 mgs; Riboflavin, 1,000 mgs; d-Pantothenic acid (as Calcium d-Pantothenate), 1,600 mgs (1740 mgs); Niacin, 8,000 mgs; Choline chloride, 90,000 mgs; Menadione Sodium Bisulfite Complex (Menadione 132 mgs), 400 mgs; Folic acid, 120 mgs; and dl-Methionine, 70.8 grams.

Example B 25 ppm of N-[3',4'-bis(trifluoromethyl)]-N'-(4'-nitro-3'-trifluoromethyl)-methylmalonanilide was added to a standard chicken feed of the following composition:

Broiler Starter Ration

| Ingredients | Ration % | lbs/2000 lb. mix |
|---|---|---|
| Corn meal | 42.00 | 840 |
| Soybean meal | 39.00 | 780 |
| Meat scraps | 3.00 | 60 |
| Fish meal (Menhaden) | 3.00 | 60 |
| Corn distillers solubles (Produlac) | 2.00 | 40 |
| Alfalfa meal | 2.00 | 40 |
| Fat or oil | 6.80 | 136 |
| Defluorinated phosphate | 1.20 | 24 |
| Limestone | 0.10 | 2 |
| Salt | 0.50 | 10 |
| Vitamin mix (Whit-Vim No. 5)** | 0.25 | 5 |
| Trace minerals (Premix formulation*) | 0.10 | 2 |
| dl Methionine | 0.05 | 1 |
| | 100.00 | 2000 |

*Trace Minerals premix formulation: Manganese, 6.00%; Zinc, 2.00%; Iron, 2.00%; Copper, 0.20%; Iodine, 0.12%; Cobalt, 0.02%; Calcium, 26.28% – 31.28%.

**WHIT-VIM No. 5 is a commercially available vitamin premix containing per lb. of premix: Vitamin A, 1,200,000 USP units; Vitamin D₃, 400,000 IC units; Vitamin E, 1,000 I units; Vitamin B₁₂ activity, 2.4 mgs; Riboflavin, 1,000 mgs; d-Pantothenic acid (as Calcium d-Pantothenate), 1,600 mgs(1740 mgs); Niacin, 8,000 mgs; Choline The feed with 50 ppm N-[3',4'-bis(trifluoromethyl)]-N'-(4'-nitro-3'-trifluoromethyl)-methylmalonanilide added thereto was fed ad lib to chicken poults (Hubbard white mountain cross) at seven days of age. Approximately 48 hours after administration of the N-[3',4'-bis(trifluoromethyl)]-N'-(4'-nitro-3'-trifluoromethyl)-methylmalonanilide medicated feed, the poults were inoculated orally into the crop with 100,000 sporulated oocysts of E. Tennella ova. Results of this test indicate that N-[3',4'-bis(trifluoromethyl)]-N'-(4'-nitro-3'-trifluoromethyl)-methylmalonanilide prevents coccidiosis in most chickens as evidenced by absence of typical cecal lesions characteristic of coccidiosis.

I claim:
1. A compound of the formula:

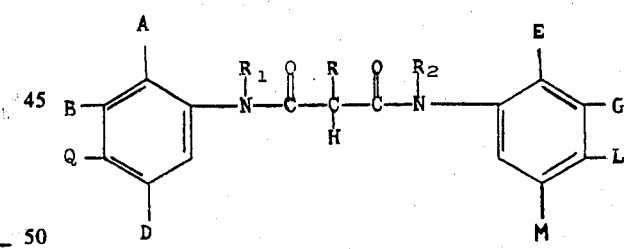

wherein A, B, Q, D, E, G, L and M are each selected from the group consisting of hydrogen, NO₂, CF₃, Cl and Br with the proviso that 3 to 5 of these are hydrogen and that A and E cannot be NO₂;

R₁ and R₂ are each selected from the group consisting of H and C₁–C₄ alkyl; and

R is selected from the group consisting of C₁–C₆ alkyl and cyclopentenyl.

2. The compound of claim 1 wherein A is hydrogen and B is CF₃.

3. The compound of claim 1 wherein R is methyl.

4. The compound of claim 1 wherein R₁ and R₂ are hydrogen.

5. The compound of claim 1 wherein G, L and M are chloro.

6. The compound of claim 2 wherein R is methyl and $R_1$ and $R_2$ are hydrogen.

7. The compound of claim 6 which is N,N'-bis(4'-nitro-3'-trifluoromethyl)-methylmalonanilide.

8. The compound of claim 6 which is N,N'-bis[3',4'-bis(trifluoromethyl)]-methylmalonanilide.

9. The compound of claim 6 which is N-[3',4'-bis(trifluoromethyl)]-N'-(4'-nitro-3'-trifluoromethyl)-methylmalonanilide.

10. The compound of claim 6 which is N-[3',4'-bis(trifluoromethyl)]-N'-(4'-nitro-2'-trifluoromethyl)-methylmalonanilide.

11. The compound of claim 6 which is N-[3',4'-bis(trifluoromethyl)]-N'-(3',5'-dichloro)-methylmalonanilide.

12. The compound of claim 6 which is N-[3',4'-bis(trifluoromethyl)]-N'-(4'-nitro)-methylmalonanilide.

13. The compound of claim 6 which is N,N'-dimethyl-N,N'-bis [3',4'-bis(trifluoromethyl)]-methylmalonanilide.

14. The compound of claim 1 which is N,N'-bis(3',4'-dichloro)-methylmalonanilide.

15. The compound of claim 6 which is N-[3',4'-bis(trifluoromethyl)]-N'-(3',4',5'-trichloro)-methylmalonanilide.

16. The compound of claim 2 which is N,N'-bis[3',5'-bis(trifluoromethyl)]-ethylmalonanilide.

\* \* \* \* \*